US012291370B2

(12) United States Patent
Dülme et al.

(10) Patent No.: US 12,291,370 B2
(45) Date of Patent: May 6, 2025

(54) DEVICE FOR APPLYING LABELS TO A WORKPIECE

(71) Applicant: Weidmüller Interface GmbH & Co. KG, Detmold (DE)

(72) Inventors: Christian Dülme, Paderborn (DE); Faysal Dogan, Horn-Bad Meinberg (DE); Klaus Bardutzky, Karlsruhe (DE)

(73) Assignee: Weidmüller Interface GmbH & Co. KG, Detmold (DE)

( * ) Notice: Subject to any disclaimer, the term of this patent is extended or adjusted under 35 U.S.C. 154(b) by 0 days.

(21) Appl. No.: 18/565,751

(22) PCT Filed: May 20, 2022

(86) PCT No.: PCT/EP2022/063777

§ 371 (c)(1),
(2) Date: Nov. 30, 2023

(87) PCT Pub. No.: WO2022/258351

PCT Pub. Date: Dec. 15, 2022

(65) Prior Publication Data

US 2024/0253845 A1 Aug. 1, 2024

(30) Foreign Application Priority Data

Jun. 7, 2021 (DE) ..................... 10 2021 114 554.6

(51) Int. Cl.
*B65C 1/02* (2006.01)
*B65C 9/36* (2006.01)

(52) U.S. Cl.
CPC ................ *B65C 1/021* (2013.01); *B65C 9/36* (2013.01)

(58) Field of Classification Search
CPC ................................ B65C 1/021; B65C 9/36
See application file for complete search history.

(56) References Cited

FOREIGN PATENT DOCUMENTS

| | | | |
|---|---|---|---|
| AT | 508165 | A1 | 11/2010 |
| CN | 211944072 | U | 11/2020 |
| DE | 102008032019 | A1 | 1/2010 |
| JP | 2005075378 | A | 3/2005 |
| JP | 2007325501 | A | 7/2009 |

OTHER PUBLICATIONS

Translation of Written Opinion of PCT/EP2022/063777.*

* cited by examiner

*Primary Examiner* — Sonya M Sengupta
(74) *Attorney, Agent, or Firm* — Laubscher & Fretwell, P.C.

(57) ABSTRACT

A device for applying labels to a workpiece includes a linearly movable punch, by which a label which has been taken up can be applied to a workpiece, and a positioning aid, which assists correct positioning of the workpiece. The positioning aid has at least two line lasers which are oriented and arranged such that each one emits a fan of light in a plane which runs parallel to a displacement direction of the punch, and the two fans of light intersect.

8 Claims, 1 Drawing Sheet

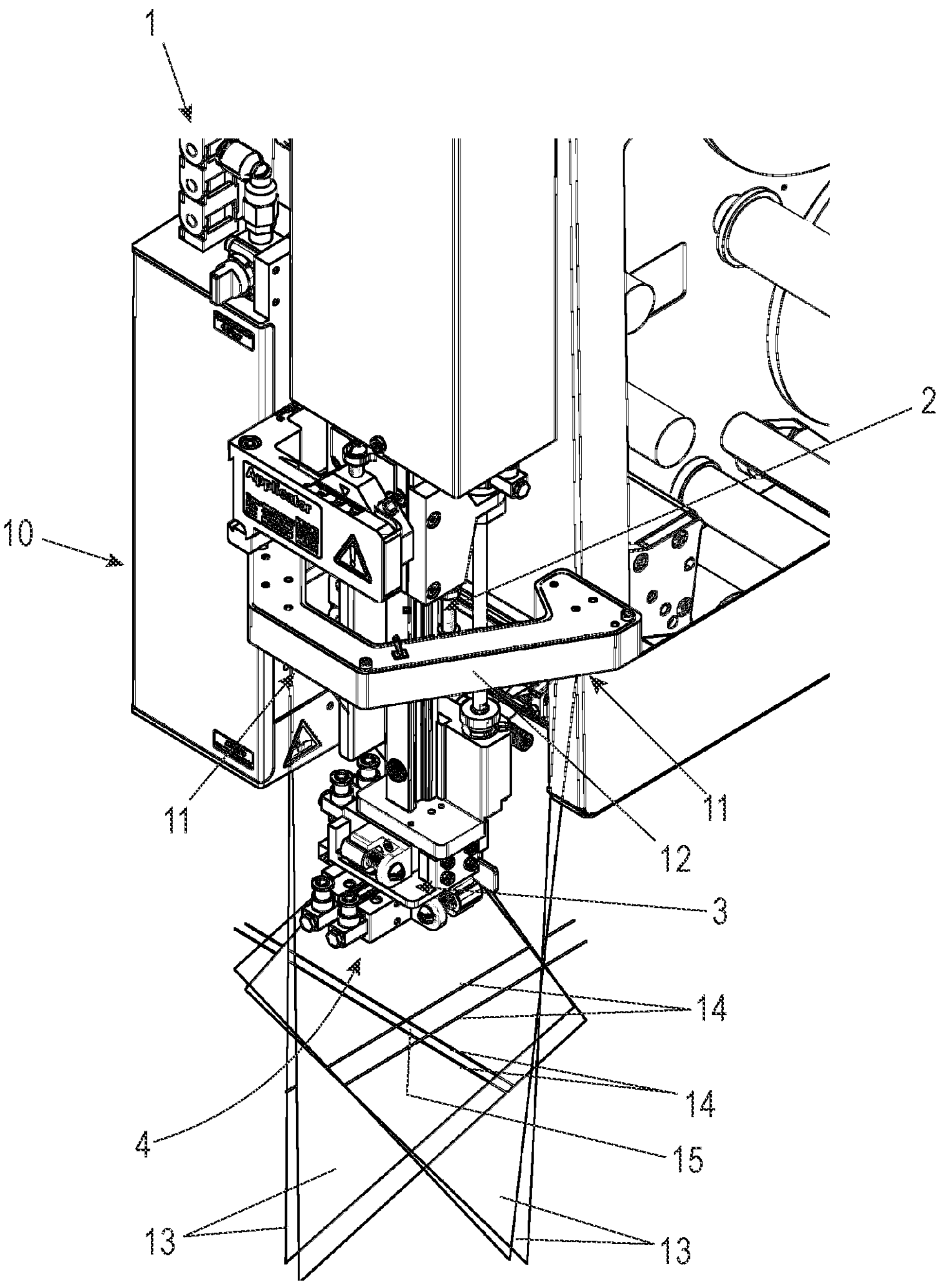
1
2
10
11
11
12
3
14
14
4
15
13
13

DEVICE FOR APPLYING LABELS TO A WORKPIECE

BACKGROUND OF THE INVENTION

The invention relates to a device for applying labels, and in particular adhesive labels, to a workpiece such as an electrical and/or electronic component.

Electrical and/or electronic components are employed in various ways in switch cabinets or other control apparatuses. In order to simplify wiring of such electrical or electronic components, these are frequently equipped with labels prior to assembly, with these labels making it possible to identify and to match with circuit and/or wiring diagrams.

Label printers are used for this purpose. They prepare appropriate labels and deliver them to an applicator, which deposits the labels onto the components. Such applicators have a linearly movable punch at the front, free end, which also includes a take-up device, also called a transfer head, for the pre-printed label. The workpiece, i.e. the electrical and/or electronic component, is positioned under the punch, which then moves out and glues the taken-up label at an intended location. The workpiece must be correctly positioned for this purpose, in order to attach the label to the intended location.

If a number of identical components are being labelled in this manner, positioning aids in the form of mechanical stops are generally employed on a workbench underneath the device. The component is appropriately positioned by being applied to the stops before the punch is lowered. If different components are being labelled, stops in the form of exchangeable templates can be used in order to achieve correct positioning for different types of components.

In the case of a large variety on workpieces or components to be labelled, this requires a variety of templates which are correspondingly large.

Frequent, manual changing of the templates when changing workpieces or components is time-consuming and prone to error.

Therefore, there is a need to provide a device for applying labels of the above mentioned type, in which a workpiece, even without appropriate stop surfaces or templates, can be positioned in a simple manner such that a label is deposited on a desired target surface.

SUMMARY OF THE INVENTION

It is an object of the present disclosure to provide a device that includes a linearly movable punch, by which a label that has been taken up can be applied to a workpiece. The device includes a positioning aid, which assists correct positioning of the workpiece, and which has at least two line lasers oriented and arranged such that each one emits a fan of light in a plane which runs parallel to a displacement direction of the punch. These fans of light intersect one another.

Through the described arrangement of the line lasers, an angle, which serves as a positioning aid, is projected onto the workpiece. The projected angle is, in its lateral position, independent of the height of the workpiece. The orientation of the fans of light makes it possible to generate a line of intersection between the fans of light which reflects the displacement path of a corner of the label without the laser itself having to be positioned at this location. This would otherwise be barely possible in terms of construction.

In an advantageous configuration of the device, the line lasers are arranged at a holder that is situated in a region of a transfer head, which is arranged on a free end of the punch.

The transfer head takes up the label for depositing onto the workpiece. The holder can be affixed to the transfer head and move with it or alternatively can be affixed to an unmoved part of the device. In particular, the line lasers, viewed starting from the punch, can be positioned radially outside of the transfer head, i.e. in a position at which sufficiently free construction space is available and at which the lasers do not collide with other components of the transfer head.

In another advantageous configuration, the device has four line lasers which are arranged and oriented such that their fans of light run parallel to one another in pairs. The four line lasers preferably project lines onto a plane underneath that of the transfer head, these lines running along the positions of the edges of the label while the punch is moved out. It is therefore possible to project the shape, which in the case of labels is mainly rectangular, onto the workpiece. In alternative configurations it is also possible to employ three line lasers, which are each at an angle of 60° to one another, as a result of which a triangle is projected onto the workpiece—a shape which labels with warning notices frequently have.

In another advantageous configuration, the device is set up to deposit labels onto electrical or electronic components, in particular for use in switch cabinets. Thus, components such as fuses, protective devices, etc. that are regularly used prelabelled in switch cabinets can also be used in a wide range of configurations without mechanical stops or place-on templates.

BRIEF DESCRIPTION OF THE DRAWING

The invention will be explained in greater detail below using an exemplary embodiment with the aid of a FIGURE.

The FIGURE shows a schematic isometric view of a device for applying labels to a workpiece.

DETAILED DESCRIPTION

The FIGURE shows a schematic isometric depiction of a device 1 for attaching labels 4 onto a workpiece (not shown here). The device 1 will also be referred to as an applicator 1 below. It is subordinate to, or rather integrated into, a label printer which is indicated at the right edge of the FIGURE.

The applicator 1 has a linearly movable punch 2 which is arranged in a generally vertical orientation and which moves out, or extends, downward. The applicator can also be employed in other orientations in which the punch 2 does not move downward, but rather it moves in a different spatial direction.

At a free end of the punch 2 there is attached a transfer head 3, which takes up a printed label 4 and fixes it downward by its adhesive surface, for example with the aid of negative pressure.

To transfer the label 4 onto the workpiece, the workpiece is positioned underneath the movable punch 2 and the punch 2 is moved out until it encounters resistance or has reached the end of its path of movement. The label is pressed by its adhesive surface onto the surface of the workpiece and remains there when the punch 2 retreats back again.

The applicator 1 has a positioning aid which includes four line lasers 11. These are mounted on a holder 12 which is in the shape of a quarter-circle and which is arranged around the transfer head 3. The holder 14 remains in its position when the transfer head 3 on the punch 2 is lowered. In an alternative configuration, the holder can be mounted on the transfer head 3, such that it moves downward with the transfer head 3.

Each of the line lasers 11 span a fan of light 13 situated in a plane, with the required opening angle of the fan of lights depending on the path of movement of the punch 2 and the size of the label 4. In general, an opening angle of approximately 10-30° is sufficient.

The line lasers 11 are arranged in pairs on the holder 12, with two of the line lasers 11 in each case being mounted beside one another. The pairs of line lasers 11 are arranged on the holder 12 offset from one another by 90°.

The pair of line lasers 11 are oriented such that their fans of light 13 are situated in parallel planes to one another. The planes of the fans of light 13 of another pair are intersected in this embodiment at an angle of 90°. In this manner, a grid pattern of a total of four lines 14 is projected onto a plane underneath the punch 2, of which two lines 14 in each case run parallel to one another and intersect the other two lines 14 at an angle of 90°. The plane which the grid pattern is projected onto is generally a normal plane relative to the displacement direction of the punch 2, as it is with the plane onto which the label is glued. That is, a plane which is perpendicular on the displacement direction.

In an area of intersection 15 of the lines 14, a rectangle having a size of the label 4 is outlined and is located at the position thereof. Both the size and position of the rectangle are independent of the spacing of the plane relative to the rest position of the transfer head 3 or to the holder 14. This means that the correct position and size of the label 4 on a workpiece is projected independently of the height of the workpiece although the line lasers 11, viewed radially, are mounted on the holder 14 with significantly further spacing than the edge of the label 4. In order to achieve this, the plane of each fan of lights 13 is oriented parallel to the displacement direction of the punch 2.

The arrangement of the line lasers 11 makes it possible for the lines of intersection between the fans of light 13 to run precisely at the corners of the label without the line laser 11 itself having to be positioned at these locations. If a laser beam were not to use fans of light it would be difficult to position the laser such that the beam of light would run correctly along the displacement path of a corner of the label 4, without this leading to a problematic arrangement of the laser in the transfer head 3.

The use of the line lasers 11 which are positioned radially outside of the label 4 and of which the fans of light 13 are in a plane oriented parallel to the displacement direction of the punch 2, makes it possible to correctly project the outline or lay-on edges onto the workpiece. This projection is independent of the spacing of the workpiece from the line lasers 11. Therefore the line lasers 11 can either be arranged fixed on the applicator 1 or be moved alongside the punch 2.

By employing four line lasers 11 in the present case, the entire periphery of a rectangular label 4 can be projected onto the workpiece. In alternative configurations, it is possible to use only two lines laser 11 which are arranged and oriented such that the planes of their fans of light 13 intersect, for example at an angle of 90°. In this manner, an angle, which also already represents a suitable positioning aid, is projected onto the workpiece.

The invention claimed is:

1. A device for applying labels to a workpiece, comprising a linearly movable punch configured to apply a label to a workpiece and a positioning aid to assist correct positioning of the workpiece, wherein the positioning aid has at least two line lasers oriented and arranged to each emit a fan of light in a plane parallel to a displacement direction of the punch, the two fans of light intersecting.

2. The device according to claim 1, wherein the line lasers are arranged at a holder situated at a region of a transfer head, the transfer head being arranged on a free end of the punch to take up the label for depositing onto the workpiece.

3. The device according to claim 2, wherein the holder is affixed to and moves with the transfer head.

4. The device according to claim 2, wherein the holder is affixed to a stationary part of the device.

5. The device according to claim 2, wherein the line lasers are positioned radially outside of the transfer head relative to the punch.

6. The device according to claim 1, comprising four line lasers arranged and oriented such that their fans of light are parallel to one another in pairs.

7. The device according to claim 6, wherein the four line lasers project lines onto a plane underneath the transfer head along the positions of the edges of the label while the punch is moved out.

8. The device according to claim 1, configured for depositing labels onto electrical or electronic components for use in switch cabinets.

* * * * *